Figure 2:
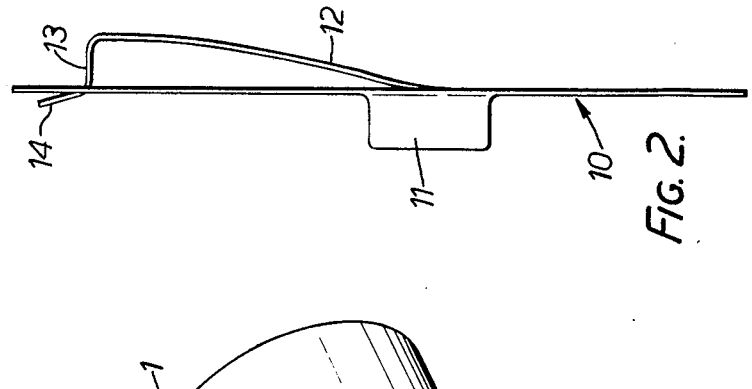

United States Patent [19]

Bradley

[11] 4,305,484

[45] Dec. 15, 1981

[54] VEHICLE DISC BRAKES

[75] Inventor: Alan P. Bradley, Solihull, England

[73] Assignee: Lucas Industries Limited, Birmingham, England

[21] Appl. No.: 116,626

[22] Filed: Jan. 29, 1980

[30] Foreign Application Priority Data

Feb. 26, 1979 [GB] United Kingdom ............ 06687/79

[51] Int. Cl.³ ............................................ F16D 65/00
[52] U.S. Cl. ............................................... 188/73.32
[58] Field of Search ................. 188/73.6, 73.5, 73.3

[56] References Cited

U.S. PATENT DOCUMENTS 3,917,032  11/1975  Hoffman et al. .................. 188/73.3
4,027,752   6/1977  Brix ................................... 188/73.6

FOREIGN PATENT DOCUMENTS 1075371  7/1967  United Kingdom .
1515484  6/1978  United Kingdom .

Primary Examiner—Bernard Nozick
Attorney, Agent, or Firm—Scrivener, Clarke, Scrivener and Johnson

[57] ABSTRACT

In a vehicle disc brake having a support structure (1) defining a cylinder base for a piston (2) for actuating a pad assembly (6, 7) the assembly is retained in place by a retaining plate (10) having projections (11) which engage in recesses (9) in the pad assembly and an integral, resilient finger (12) having at its free, outer end a shoulder (13) engaging the piston (2) and a projection tab (14) which facilitates flexing of the finger to disengage the shoulder (13) from the piston (2), thereby releasing the plate and the pad assembly for removal from the support structure.

5 Claims, 2 Drawing Figures

U.S. Patent  Dec. 15, 1981  4,305,484

VEHICLE DISC BRAKES

This invention relates to vehicle disc brakes comprising a support structure which includes a cylinder body housing a piston, and a friction pad assembly with which the piston has thrust transmitting engagement during brake application.

It has previously been proposed for example in British Pat. No. 1075371, to retain the brake pad in its operative position by means of pins or guide surfaces along which the brake pad can slide in operation, but with this arrangement, partial dismantling of the support structure of the brake is required to permit removal of a worn pad assembly.

It has also been proposed, in British Pat. No. 1515484, to employ a plate arranged between the pad assembly and the piston, the plate acting to obstruct movement of the pad assembly into a fully retracted position in which it can be disengaged from the brake structure and thus freed for radial removal. In such an arrangement, the retainer plate must be removed as a preliminary to release and removal of the pad assembly.

It is an object of the present invention to provide a brake pad retaining plate of simple construction, and which facilitates removal of the brake pad assembly when desired.

The invention is mainly characterised by the fact that the plate is engaged with the piston by a resiliently flexible portion which can be manually displaced to disengage it from the piston and thereby permit removal of the pad assembly and the plate together from the support structure.

With this arrangement, the retaining plate can be of simple construction and still be effective in its primary task of preventing inadvertent removal of the pad assembly. Furthermore, the fact that the retaining plate can be disengaged from the piston merely by displacing the resilient portion makes it possible to release the pad assembly and retaining plate together in a simple manner, without the need to dismantle the support structure of the brake, nor to remove the retaining plate separately, as a preliminary to pad removal.

In a particularly convenient embodiment, the flexible portion is formed as a spring finger, integral at its root with the remainder of the plate and extending outwardly towards its free end, where the finger is formed with a shoulder for engagement with the piston and with an outwardly projecting tab to facilitate displacement of the finger.

Further features and advantages of the invention will appear from the following description, given by way of example, of the above mentioned embodiment, which is illustrated in the accompanying drawings, in which:

FIG. 1 is an exploded perspective view of part of a disc brake and retainer plate in accordance with the invention, and FIG. 2 is a side view of the retainer plate shown in FIG. 1.

The disc brake shown in the drawings comprises a caliper half body 1 defining a cylinder for a cup-shaped actuating piston 2. A flexible sealing boot 3 is attached to the exterior of the piston and the body 1 to prevent the ingress of dirt and moisture into the cylinder.

The body 1 has forwardly extending side portions 4 whose inner confronting faces 5 provide guidance for the opposite end edges of the backing plate 6 carrying a friction block 7, the plate 6 and block 7 constituting a brake pad assembly. The backing plate 6 has laterally extending ears 8 which ride over the upper edges of side portions 4 to limit inward radial movement of the assembly. A pair of laterally spaced holes 9 are provided in the plate 6.

The brake pad retainer plate, shown generally at 10, is made of a resilient material, such as spring steel or stainless steel sheet, conveniently by pressing. The plate is of generally rectangular form, and has a pair of forwardly projecting lugs 11 at its lateral edges for engagement in the back plate holes 9. A finger 12 is defined between a pair of parallel slits which leave the finger integrally joined at its root to the central portion of the plate. The finger extends rearwardly of the plane of the plate to its radially outer, free end, where the finger is shaped to define a shoulder 13 and an outwardly projecting tab 14.

In the assembled brake, the root of the finger lies close to the axis of the piston, and the finger extends rearwardly and radially outwardly to engage the internal surface of the piston skirt through the shoulder 13, with the tab 14 projecting beyond the outer surface of the piston. The lugs 11 project axially into the back plate holes 9, so that the back plate is locked by the retainer plate against radially outward movement.

Removal of the brake pad is readily effected by pressing the tab 14 forwardly, to disengage the shoulder 13 from the piston. The brake pad and retainer plate can then be drawn radially out of the caliper.

In addition to its function of retaining the pad against radial removal, the retainer plate provides for axial pad movement without sliding, helps to shield the interior of the piston against the entry of water and dirt, and acts as an anti-squeal shim. Additionally, it acts as a heat shield to protect the sealing boot from the heat of the pad. This heat shielding function can be increased by making the plate of, or facing it with, a heat insulating material.

I claim:

1. In or for a vehicle disc brake assembly comprising a support structure defining a cylinder body, a brake actuating piston housed within said cylinder body, a brake pad assembly movably mounted on said body for movement along the axis of said piston under thrusts applied to said pad assembly by said piston in the course of braking application, and a pad assembly retainer plate positioned between said piston and said pad assembly, said plate including a pad assembly engaging portion detachably engageable with said pad assembly in a manner preventing relative radial movement between said plate and said pad assembly with respect to said support structure, said plate also including a piston engaging portion detachably engageable with said piston to prevent undesired movement of said pad assembly and retaining plate relative to said support structure in a direction radially outward of said structure, said piston engaging portion including a part projecting outwardly beyond the piston for resiliently displacing said piston engaging portion to release it from engagement with said piston, thereby to free the plate and pad assembly for removal together from said support structure.

2. The improvement claimed in claim 1, wherein said retaining plate is of generally planar form, and said piston engaging portion is constituted by a resilient finger having a root integral with the remainder of the plate at a medial region thereof and having a free end engageable with said piston, said free end including said part projecting outwardly beyond the piston for disengaging said plate from said piston by flexure of said finger by means of said projecting part.

3. The improvement claimed in claim 2, wherein said projecting part of the piston engaging portion is a tab integral with and projecting outwardly from the free end of said finger.

4. The improvement claimed in claim 2, wherein said piston is cup-shaped, having an open end directed towards said pad assembly, said free end of said finger engaging the inner surface of said piston adjacent the open end thereof.

5. The improvement claimed in claim 2, wherein said retaining plate is formed as a unitary pressing of resilient material, said finger being set to extend rearwardly out of the general plane of said plate.

* * * * *